US012332907B2

(12) United States Patent
Archer, III et al.

(10) Patent No.: US 12,332,907 B2
(45) Date of Patent: Jun. 17, 2025

(54) TECHNIQUE FOR CONSTRUCTING AND MAINTAINING AN APPLICATION-TO-FRIEND INDEX

(71) Applicant: Snap Inc., Santa Monica, CA (US)

(72) Inventors: Virgil L. Archer, III, Los Angeles, CA (US); John Trent DiBacco, Lake Forest, CA (US); Matthew Alan Jones, Ladera Ranch, CA (US); Bernardo Perez, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 261 days.

(21) Appl. No.: 17/900,365

(22) Filed: Aug. 31, 2022

(65) Prior Publication Data

US 2024/0070162 A1   Feb. 29, 2024

(51) Int. Cl.
  *G06F 16/25*      (2019.01)
  *G06F 16/23*      (2019.01)
  *G06F 16/245*     (2019.01)
  *G06Q 50/00*      (2024.01)

(52) U.S. Cl.
  CPC ........ *G06F 16/252* (2019.01); *G06F 16/2379* (2019.01); *G06F 16/245* (2019.01); *G06Q 50/01* (2013.01)

(58) Field of Classification Search
  CPC .. G06F 16/252; G06F 16/2379; G06F 16/245; G06Q 50/01
  See application file for complete search history.

(56) References Cited

U.S. PATENT DOCUMENTS

| | | | | |
|---|---|---|---|---|
| 9,363,221 | B1* | 6/2016 | Ozog | H04L 67/306 |
| 2012/0310956 | A1* | 12/2012 | Huhn | A63F 13/795 |
| | | | | 707/769 |
| 2015/0294377 | A1* | 10/2015 | Chow | G06Q 30/0263 |
| | | | | 705/347 |
| 2016/0055010 | A1* | 2/2016 | Baird | G06F 16/9535 |
| | | | | 707/727 |
| 2017/0199920 | A1* | 7/2017 | Pearson | H04L 67/02 |
| 2017/0319968 | A1* | 11/2017 | Craine | A63F 13/48 |
| 2022/0222225 | A1* | 7/2022 | Mietke | G06F 16/212 |

(Continued)

OTHER PUBLICATIONS

Yu et al. Sep. 4, 2019, "Video Games and Social Relation", https://scholarcommons.scu.edu/cgi/viewcontent.cgi?article=1043 &context=engl_176, 2019. (Year: 2019).*

(Continued)

*Primary Examiner* — Matthew J Ellis
(74) *Attorney, Agent, or Firm* — Schwegman Lundberg & Woessner, P.A.

(57) ABSTRACT

Described herein is an application-to-friend data service for constructing and maintaining an application-to-friend index. The data service has a first service component that is triggered when an end-user opens an application. The first service component performs operations to update the database table with current data concerning other end-users who are friends of the end-user on whose behalf the data service has been invoked. The data service includes a second service component to receive and process a query by efficiently returning, for a given end-user and a given application, a list of connections or friends of the given end-user who are also end-users of the application.

17 Claims, 9 Drawing Sheets

(56) References Cited

U.S. PATENT DOCUMENTS

2023/0103076 A1\* 3/2023 Zhou ................ G06F 21/6218
726/1

OTHER PUBLICATIONS

Bhandari et al., "Friend Finder: A Lifestyle based Friend Recommender App for Smart Phone Users", https://core.ac.uk/download/pdf/539906375.pdf, 2016, pp. 4-8 (Year: 2016).\*

\* cited by examiner

US 12,332,907 B2

TECHNIQUE FOR CONSTRUCTING AND MAINTAINING AN APPLICATION-TO-FRIEND INDEX

TECHNICAL FIELD

The present disclosure relates to an online or Internet-enabled service with an integrated data service for constructing and maintaining an application-to-friend index that can be efficiently queried to obtain, for a given end-user of the online service and an application, the set of connected end-users (e.g., connections, or friends of the given end-user), who are also end-users of the application.

BACKGROUND

Many Internet-enabled or online services provide end-users with the ability to memorialize relationships with other end-users. For instance, an end-user of an online service may interact with a user interface of an application provided by the online service to identify other end-users for purposes of inviting an end-user to establish a formal connection via the online service. Depending upon the nature of the online service, the meaning of the connection that is established between two end-users may vary. For example, some online services may be tailored to serve working professionals, and as such, a connection between two end-users may indicate a professional relationship between the two end-users. With some online services, a connection between two end-users may indicate that the two end-users are friends with one another. In any case, many online services will have a database—sometimes implemented as a graph database—that stores the connection information for all end-users. The data stored in such a database is commonly referred to as a social graph, friendship graph, or simply, a friend graph.

Many online services leverage a social graph, established by end-users forming connections with one another, to provide a variety of social features. For example, with many online services, a messaging application may provide access to a messaging service via which end-users, who have established formal connections with one another, are able to exchange messages. Another example of a social feature is a content feed, sometimes referred to as a newsfeed, via which an end-user can post and share content items with other connected end-users. Typically, the content items that are selected for presentation to a given end-user are content items shared by other end-users who are connected, via the social graph, to the given end-user.

Some online services provide an ecosystem or platform via which end-users are provided with access to a variety of integrated, individual applications—sometimes referred to as mini applications, or mini-apps. For instance, a main application provided by the online service, which may be referred to as a super application or super app, may serve as a host to a variety of mini-apps accessible to end-users. Each mini-app provides a specific feature, function or service. A mini-app, hosted by the main app, may be discoverable and accessible to an end-user of the main app through a variety of discovery points. Mini-apps may be developed through use of a software development kit (SKD) that is provided by the operator of the online service. A mini-app may be designed to leverage various features, resources, and data services of the online service. One of the many resources that a mini-app may access is the social graph data of the online service. However, as set forth below, providing a mini-app access to the social graph or friend graph maintained by the online service may give rise to a variety of technical difficulties.

BRIEF DESCRIPTION OF THE DRAWINGS

In the drawings, which are not necessarily drawn to scale, like numerals may describe similar components in different views. To easily identify the discussion of any particular element or operation, the most significant digit or digits in a reference number refer to the figure number in which that element is first introduced. Some non-limiting examples are illustrated in the figures of the accompanying drawings in which.

DETAILED DESCRIPTION

Figure 1:
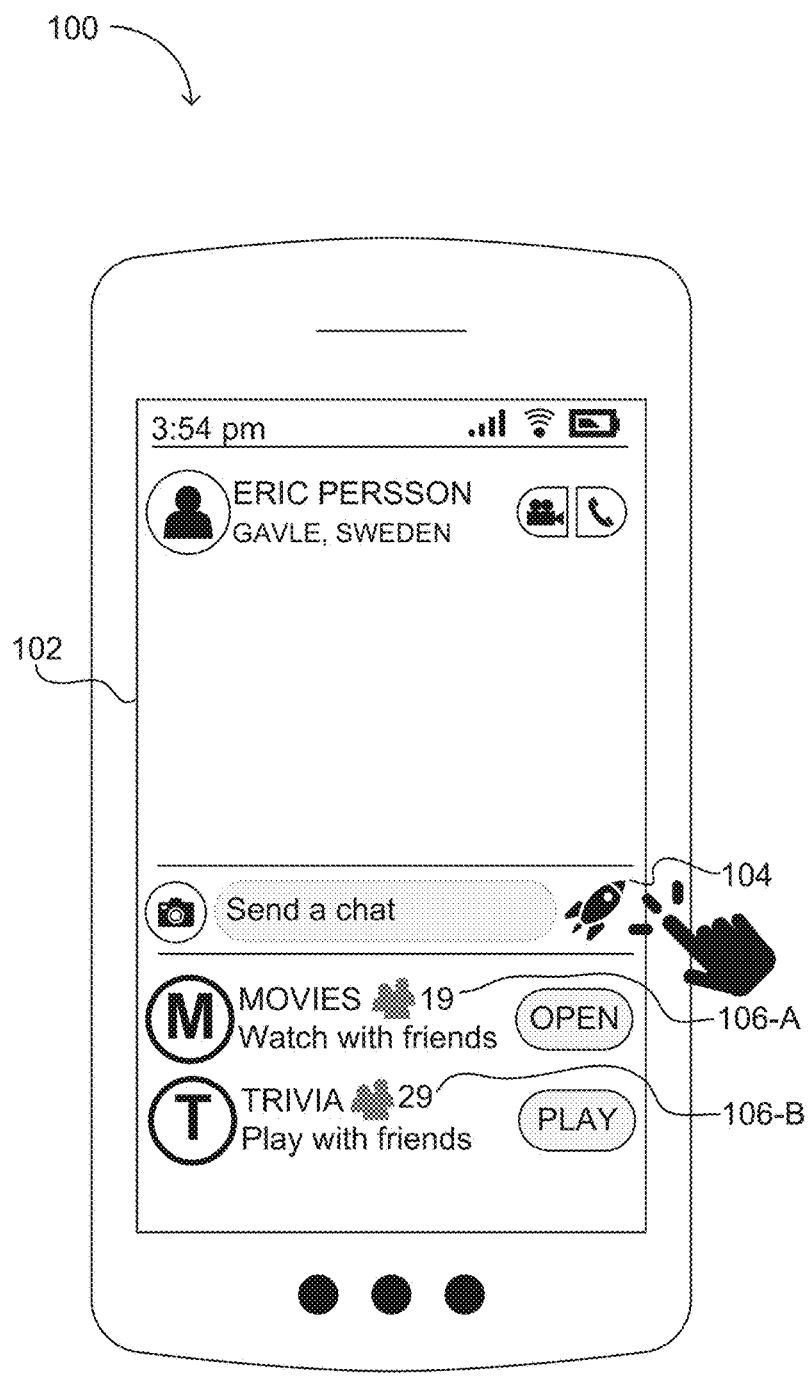
FIG. 1 illustrates an example of a user interface for a mobile application associated with an online service, where the user interface displays an application icon for each of several mini-apps that are accessible to an end-user of the mobile application, along with a number indicating how many connected end-users (e.g., friends) use a mini-app, consistent with embodiments of the present invention.

Described herein is a software-based data service for constructing, maintaining and querying an application-to-friend index, where the data service is integrated with an online service and is accessible to applications via an application programming interface (API) of a software development kit (SDK) associated with the online service. Specifically, the data service is accessible to applications via an API call, request or query that specifies as parameters an identifier for the requesting application and an identifier of the end-user on whose behalf the application is making the call, request or query. The data service will reply with a list of identifiers for end-users who are connections (e.g., friends) of the end-user and who are known end-users of the application identified in the query. In the following description, for purposes of explanation, numerous specific details and features are set forth in order to provide a thorough understanding of the various aspects of different embodiments of the present invention. It will be evident, however, to one skilled in the art, that the present invention may be practiced and/or implemented with varying combinations of the many details and features presented herein.

For purposes of the present disclosure, the term, "friend," as used hereafter, is intended to be synonymous with the term, "connection." These terms—"friend" and "connection"—are being used in a technical sense to indicate that two end-users have formally memorialized the existence of a relationship, as evidenced by data that may be maintained by a specific data service, such as a social graph service. Accordingly, two end-users may be connected via a social graph of an online service, and thus be referred to as "connections" or "friends," regardless of whether the two end-users share, in actuality, a friendship with one another. For example, two end-users who are co-workers or colleagues and are connected via the online service may be referred to herein as connections or friends. Furthermore, after two end-users have established a formal connection, it is possible that one or the other end-user may take action, via the online service, to end or terminate the formal relationship—an act sometimes referred to as unfriending or defriending.

Many application developers—specifically, developers of mini-apps—are taking a social or friend-centric approach to developing applications by implementing social features that rely on data from an end-user's social graph. For example, a mini-app that is hosted by a super app may leverage data obtained from a social graph of the super app, thereby allowing an end-user of the mini-app to view the identity of other end-users with whom the end-user has previously established a connection, and exchange information or otherwise interact with other end-users with whom the end-user is connected. By way of example, consider the user interface 102 presented on the display of the mobile computing device shown in FIG. 1. In this example, a super app provides a messaging or chat service, giving an end-user the ability to exchange messages, or otherwise interact, with other end-users with whom the end-user has previously established a connection. In this example, when the end-user selects the icon with reference number 104, a list of mini-apps accessible to the end-user is displayed in a portion of the user interface 105. For instance, as shown in the lower portion of the user interface 105, two separate mini-apps are accessible to the end-user—a first mini-app ("MOVIES"), which enables the end-user to view streaming content, and a second mini-app ("TRIVIA"), which enables the end-user to play a trivia game with other end-users. As shown in the user interface 102, in addition to the icon and title of each mini-app, information is presented to the end-user to indicate the number of connections or friends that the end-user has who are also end-users of a particular mini-app. For instance, as shown with reference number 106-A, the end-user of the super app has nineteen ("19") connections or friends who are end-users of the mini-app with title, "MOV-IES." Similarly, as shown with reference number 106-B, the end-user of the super app who is viewing the user interface 102 has twenty-nine ("29") friends who are end-users of the mini-app with title, "TRIVIA." Typically, an end-user of a mini-app is an end-user who has previously executed, invoked, opened or otherwise accessed and used the mini-app.

Figure 2:
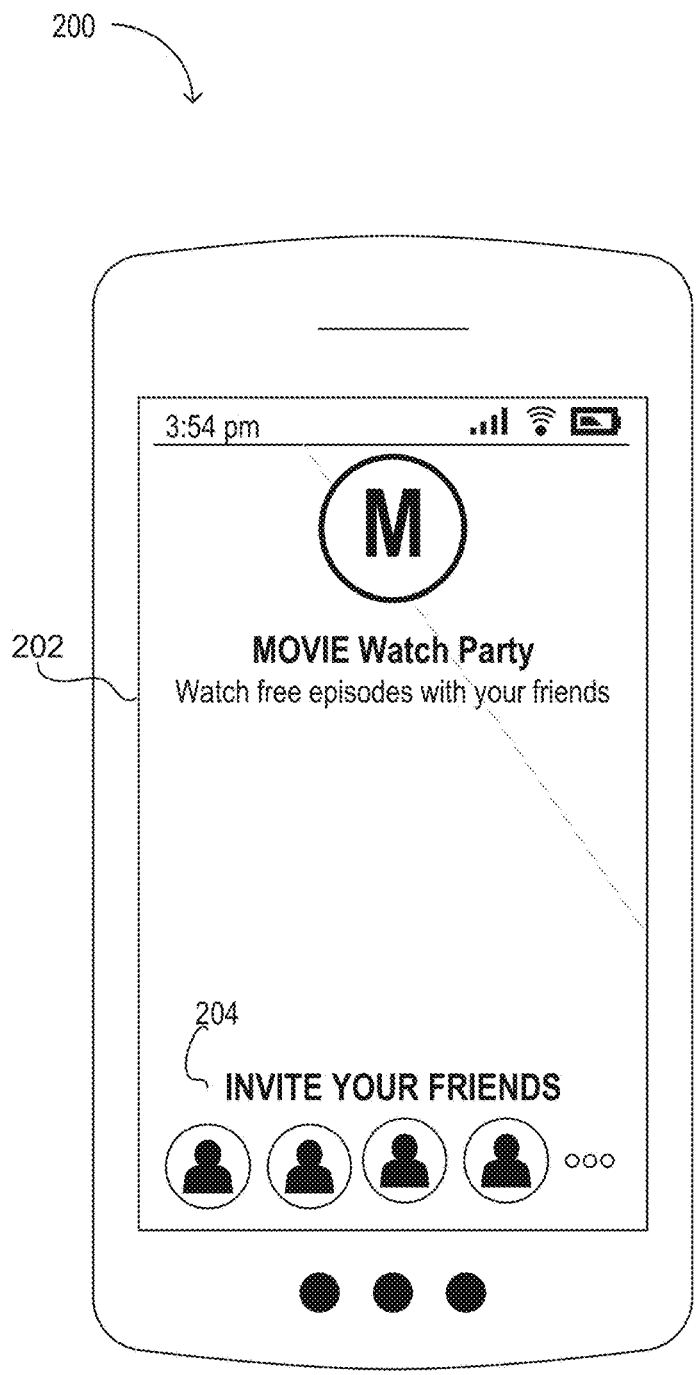
FIG. 2 illustrates an example of a user interface for a mini-app, with the user interface displaying an icon for each of several connected end-users (e.g., friends) of the end-user to whom the user interface is being presented, consistent with some embodiments of the present invention.

Referring now to FIG. 2, an example of a user interface 202 for a mini-app is shown. In this example, the mini-app with title, "MOVIES" provides a service that allows the viewing end-user—that is, the end-user to whom the user interface 202 is presented—to view streaming content (e.g., movies) concurrently with other end-users with whom the viewing end-user is connected. For example, a content streaming service associated with the mini-app may stream content simultaneously to multiple end-user devices so that multiple connected end-users can view the same content together, at the same time, but in different locations and on different devices. As shown in the user interface 202, a list of icons is presented, with each icon representing a connection or friend of the viewing end-user who is also an end-user of the mini-app. By selecting an icon associated with an end-user, the viewing end-user can initiate the sending of an invitation to a particular connection or friend, thereby initiating a common content viewing session amongst the invited end-users. In this example, an icon representing a connection or friend of the end-user is shown for each connection or friend of the viewing end-user who is also a known end-user of the mini-app (e.g., "MOVIES"). In this example, an invitation is for joining a common content viewing session, and as such, the connections or friends that are subject to being invited are those who are already end-users of the mini-app. Although not shown in FIG. 2, in other instances, a user interface may allow an end-user to invite any connection or friend to use the mini-app (e.g., for the first time), regardless of whether a connection or friend is an existing end-user of the mini-app.

Figure 3:
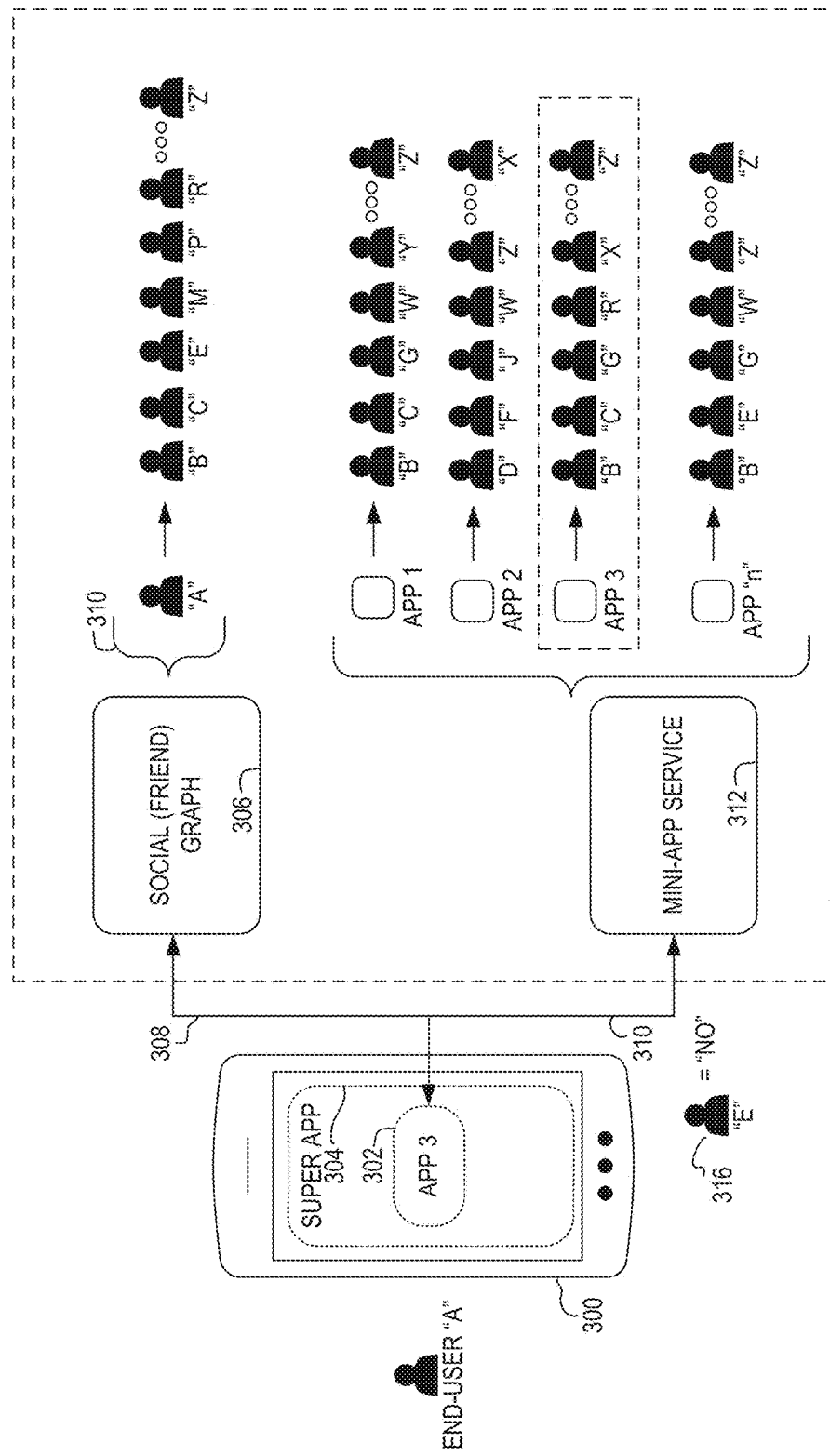
FIG. 3 is a diagrammatic representation of a conventional technique by which an application, executing at least in part on a mobile computing device, may query multiple data services of an online service to filter an end-user's connections (e.g., friends) for the purpose of identifying a subset of connections who are known to use the application.

In the examples presented in connection with FIG. 1 and FIG. 2, the user interfaces of the respective mini-apps are presenting to the viewing end-user information about the viewing end-user's connections or friends, who are also end-users of the respective mini-app. This information may include, for example, an overall count or number of connections who are end-users of the mini-app as well as information relating to the identity of each individual end-user (e.g., an end-user identifier, or ID). Accordingly, if a viewing end-user has, in total, one-thousand connections or friends via the online service, the mini-app must be configured to ascertain the specific subset of connections or friends who are also end-users of the particular mini-app. FIG. 3 illustrates an example of a conventional approach—referred to herein as a "fan-out" approach—to identifying for a particular end-user of a particular mini-app the subset of his or her connections or friends who are also end-users of the particular mini-app.

As shown in FIG. 3, a mini-app (e.g., "APP 3" with reference 302) is executing in connection with the super app 304 on the mobile computing device 300. The viewing end-user of the mini-app (e.g., "APP 3") is identified in this example as end-user "A." Using a conventional technique, which might be referred to as a "fan-out" technique, in order to present to the viewing end-user (e.g., end-user "A") the number and identity of connections or friends who are also end-users of the mini-app (e.g., "APP 3"), the mini-app must first communicate a request to a social graph service 306, which will return a complete list of all connections or friends of the end-user. This is illustrated in the example shown in FIG. 3 by the line with reference number 308. The social graph service 306 processes a request, invoked by the mini-app on behalf of the end-user (e.g., end-user "A"), and returns to the mini-app 302 a list of all end-users with whom the viewing end-user (end-user "A") is connected. In this example, a portion of the complete list is shown with reference number 310, and includes, for example, the end-users indicated as "B," "C," "E," "M," "P," "R," and "Z."

After the mini-app 302 has invoked a request 308 directed to the social graph service 306 to identify all of the connections or friends of the viewing end-user (e.g., end-user "A"), the mini-app 302 will then invoke, for each connection or friend identified in the list 310, a separate request to a mini-app service 312 to determine whether a connection or friend in the list is also an end-user of the mini-app. Accordingly, if a list of connections or friends for a particular viewing end-user indicates that the viewing end-user has one-thousand connections or friends, the mini-app 302 will be required to make a separate call or request for each connection or friend in the list, resulting in one-thousand individual calls or requests to the mini-app service 312. As shown with reference number 310, a request or call to the mini-app service 312 for purposes of determining whether the end-user identified as end-user "E" is an end-user of the mini-app identified as "APP 3" results in no information being returned (as shown with reference number 316), because end-user "E" is not a known or registered end-user of the mini-app identified as "APP 3." Accordingly, the conventional technique is not efficient—that is, it is slow and effectively wastes computing resources—as it requires a data service, such as the mini-app service 312, to process a large number of requests where no information is being returned to the requesting mini-app. For instance, using the conventional approach, in a scenario where, on average, each end-user has one-thousand connections or friends and the number of connections that are using any given mini-app is twenty-five, a mini-app must make nine-hundred and seventy-five requests that result in no relevant information being returned.

Many online services leverage publicly available cloud-based platforms or infrastructures—such as Amazon Web Services® (AWS), the Google® Cloud platform, Microsoft® Azure® or similar cloud-based services. In many instances, these cloud-based platforms charge fees that are based on some metric relating to the volume of traffic (e.g., queries processed, the quantity of data read and write operations, and so forth) that is directed to and processed by a particular service provided as part of the platform. Consequently, the conventional "fan-out" technique for determining the connections or friends of an end-user of a mini-app, as set forth above, is not only inefficient from a computing resources perspective, the conventional technique may also be expensive, from an economic or financial perspective.

Consistent with embodiments of the present invention, a data service is provided that constructs and maintains an application-to-friend index that can be efficiently queried to obtain, for a given end-user of the online service and an application, the set of connected end-users (e.g., friends, or connections of the given end-user), who are also end-users of the identified application. This data service is referred to herein as an application-to-friend data service. In comparison with the conventional approach set forth above, the application-to-friend data service is far more efficient in terms of computational resources, and as a result, more efficient from a financial or economic perspective as well. Specifically, the data service, consistent with embodiments of the invention, requires far fewer data read and write operations than the conventional approach, and thus is not only more efficient in terms of computing resources, but in many instances can be implemented to operate in a more cost-efficient manner as well.

As described in more detail below, with some embodiments, the application-to-friend data service is implemented with two service components. A first service component, referred to herein as an update processor, is triggered or invoked when an end-user executes, opens, invokes or otherwise accesses an application via a client computing device. When invoked, the update processor performs a series of data operations to update data records in an application-to-friend database accessible to the data service.

Specifically, the update processor will first add a new data record, or update an existing data record, to indicate that the end-user opened the application at a particular time (e.g., a timestamp). For instance, the added or updated record may include: a first data field for an application identifier, identifying the application that was accessed or opened by the end-user; a second data field for an end-user identifier, identifying the end-user; and a third data field for a timestamp indicating the date, or the date and time, when the application was accessed or opened by the end-user.

In addition, the update processor will update the application-to-friend database to include information or data regarding which of the end-user's connections or friends are also end-users of the application. For example, the update processor will request from a data source (e.g., a social graph service) a first list of connections or friends of the end-user. The first list of connections or friends is then compared with a second list that is maintained in the application-to-friend database by the application-to-friend data service. Any difference in the two lists is the result of the end-user having recently added a new connection or friend, having recently removed a previous connection or friend, or having recently been removed as a connection or friend by another end-user (e.g., unfriended or defriended). As the first list is maintained and managed by a social graph service, it may be thought of as the source of truth for the data, whereas the list maintained by the application-to-friend data service is in essence, temporarily cached, and updated by the update processor, when triggered by an activity event. By comparing the two lists, updates need only be made to reflect changes—that is, updates only need to be made for new connections or friends, or connections or friends that have been removed.

In any case, the update processor will update the application-to-friend database with data records to reflect which of the end-user's connections or friends are also end-users of the particular application that the end-user opened or executed. Consistent with some embodiments, when updating the database, the update processor will add two data records to reflect the bidirectional nature of the connection. For example, if an end-user, identified as end-user "A", opens a particular application, the update processor may identify end-user "B" as a connection or friend of end-user "A" who is also an end-user of the particular application. Accordingly, the update processor will create a first data record to indicate that, for the particular application and for end-user "A", end-user "B" is a connection or friend who also uses the particular application. A second data record is also added to the database table to indicate that for the particular application and end-user "B", end-user "A" is a connection or friend of end-user "B" who is also an end-user of the application.

After the update processor has performed an update to the application-to-friend database, the application may invoke a second service component—e.g., referred to herein as the query processing component—via an application programming interface (API) call or request, to process a query. Specifically, the API call or request includes a first parameter, identifying the application (e.g., an application identifier), and a second parameter, identifying the end-user (e.g., an end-user identifier). The query processing component will then process the query by identifying within the database the relevant data records that indicate which connections or friends of the end-user (as identified in the query request) are end-users of the application (as identified in the request). Finally, the query processing component will return to the application that invoked the API call or request a list of end-users who are both connections or friends of the end-user who opened the application, and end-users of the application that invoked the API request. Thus, the application-to-friend data service advantageously provides a very efficient mechanism by which an application can obtain a list of connections or friends of an end-user, who are also end-users of a particular application. Other details and advantages of various embodiments of the present invention will be readily apparent from the description of the figures that follows.

Networked Computing Environment

Figure 4:
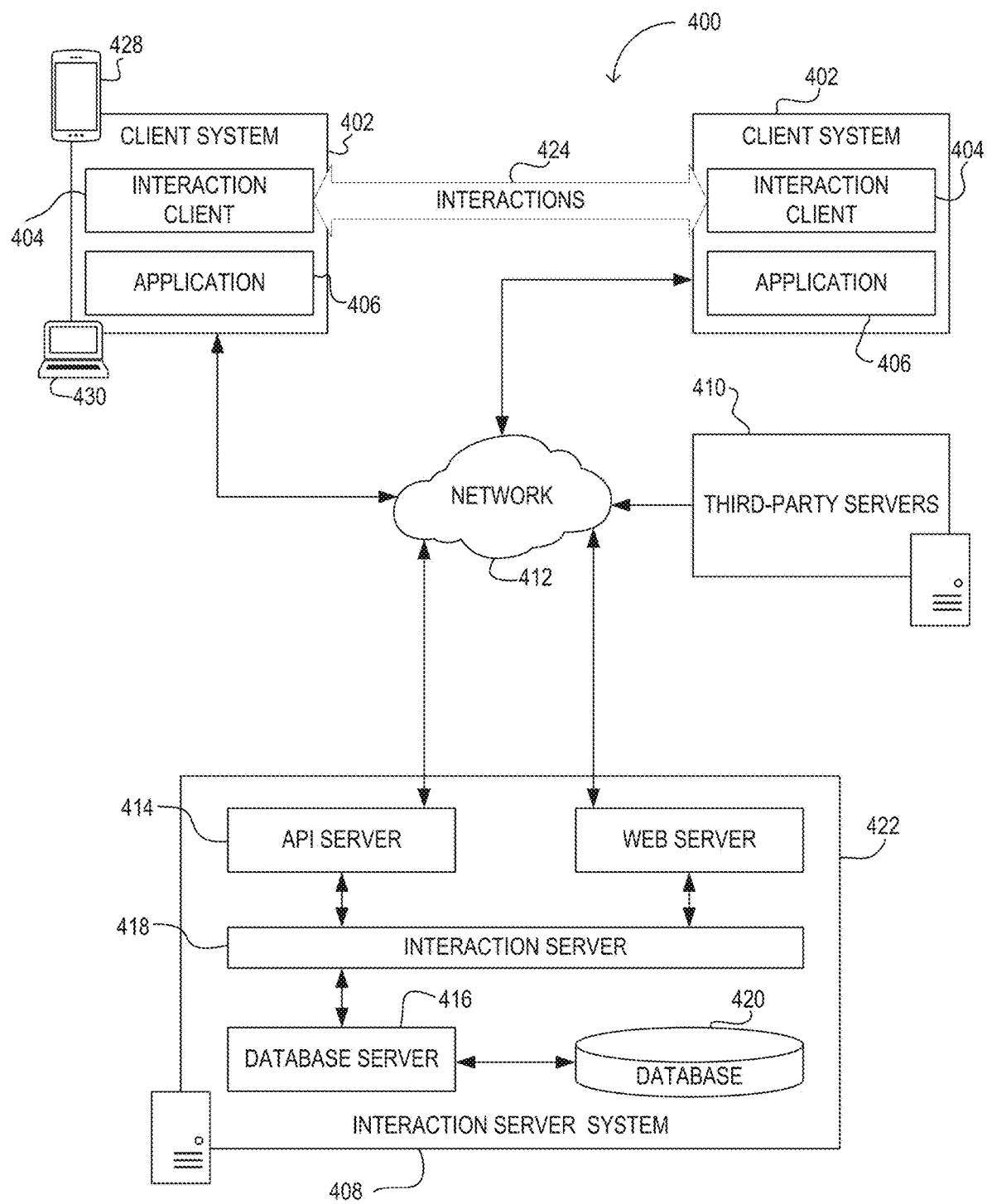
FIG. 4 is a diagrammatic representation of a networked, client/server-based environment in which a data service for constructing, managing and querying an application-to-friend index may be deployed, consistent with embodiments of the present invention.

FIG. 4 is a block diagram showing an example interaction system 400 for facilitating interactions (e.g., exchanging messages, conducting audio and video calls, playing games, and/or viewing content) over a network 412. The interaction system 400 includes multiple client systems 402, each of which hosts multiple applications, including an interaction client 404 and other applications 406. In some instances, each interaction client 404 may be a component of what is referred to as a super application or super app, providing some core functionality, while each application 406 may be a mini-app that integrates with and operates in connection with the interaction client 404. Each interaction client 404 is communicatively coupled, via one or more communication networks including a network 412 (e.g., the Internet), to other instances of the interaction client 404 (e.g., hosted on a respective client system 402), an interaction server system 408 and third-party servers 410). An interaction client 404 can also communicate with locally hosted applications 406 using Applications Programming Interfaces (APIs).

An interaction client 404 interacts with other interaction clients 404 and with the interaction server system 408 via the network 412. The data exchanged between the interaction clients 404 (e.g., interactions 424) and between the interaction clients 404 and the interaction server system 408 includes functions (e.g., commands to invoke functions) and payload data (e.g., text, audio, video, or other multimedia data). These functions and their respective payloads may be communicated via various communication protocols.

The interaction server system 408 provides server-side functionality via the network 412 to the interaction clients 404. While certain functions of the interaction system 400 are described herein as being performed by either an interaction client 404 or by the interaction server system 408, the location of certain functionality either within the interaction client 404 or the interaction server system 408 may be a design choice. For example, it may be technically preferable to initially deploy particular technology and functionality within the interaction server system 408 but to later migrate this technology and functionality to the interaction client 404 where a client system 402 has sufficient processing capacity.

The interaction server system 408 supports various services and operations that are provided to the interaction clients 404, and in some instances, the applications 406. Such operations include transmitting data to, receiving data from, and processing data generated by the interaction clients 404. This data may include message content, client device information, geolocation information, media augmentation and overlays, message content persistence conditions, social network information, and live event information. Data exchanges within the interaction system 400 are invoked and controlled through functions available via user interfaces (UIs) of the interaction clients 404.

Turning now specifically to the interaction server system 408, an API server 414 is coupled to and provides programmatic interfaces to interaction servers 418, making the functions of the interaction servers 418 accessible to interaction clients 404, other applications 406 and third-party servers 410. The interaction servers 418 are communicatively coupled to a database server 416, facilitating access to a database 420 that stores data associated with interactions processed by the interaction servers 418. Similarly, a web server 422 is coupled to the interaction servers 418 and provides web-based interfaces to the interaction servers 418. To this end, the web server 422 processes incoming network requests over the Hypertext Transfer Protocol (HTTP) and several other related protocols.

The API server 414 receives and transmits interaction data (e.g., commands and message payloads) between the interaction servers 418 and the client systems 402 (and for example, interaction clients 404 and other application 406) and the third-party servers 410. Specifically, the Application Programming Interface (API) server 414 provides a set of interfaces (e.g., routines and protocols) that can be called or queried by the interaction client 404 and other applications 406, including third-party applications and mini-applications, to invoke functionality of the interaction servers 418. The API server 414 exposes various functions supported by the interaction servers 418, including account registration, login functionality, the sending of interaction data via the interaction servers 418, from a particular interaction client 404 to another interaction client 404, the communication of media files (e.g., images or video) from an interaction client 404 to the interaction servers 418, the settings of a collection of media data (e.g., a story), the retrieval of a list of connections or friends of an end-user of a client system 402, the retrieval of messages and content, the addition and deletion of entities (e.g., friends) to an entity graph (e.g., a social graph), the location of friends within a social graph, and opening an application event (e.g., relating to the interaction client 404).

An application 406, which, for purposes of the present disclosure, includes what are sometimes referred to as mini-applications or mini-apps, invoked via the interaction client 404 of a client system 402 may, in some instances, be a third-party application. As a third-party application, the application may not have authorization to access various resources of the interaction server system 408, and will therefore need to request authorization to access various resources on the interaction server system 408, on behalf of the end-user of the client system 402. Consistent with some embodiments, an open standards authorization protocol (e.g., Open Authorization, frequently referred to as Oauth, and more precisely, Oauth v2) may be used for access delegation, so that the end-user need not provide the third-party application with his or her end-user credentials (e.g., username/password). Accordingly, when an end-user of the client system 402 invokes a third-party application, the end-user may be prompted to grant the third-party application authorization to a resource owned by the end-user (e.g., the end-user's profile data). Upon receiving an authorization grant from the end-user, the third-party application may communicate the authorization grant to an authorization server, and in return, receive an access token. Subsequent API calls made by the third-party application (e.g., during the same end-user session) and directed to various resource servers of the interaction server system 408 will include the access token. Accordingly, a resource server that is processing an API call can confirm that the end-user and third-party application from which the access token was received is in fact authorized to access the resource.

The interaction servers 418 host multiple systems and subsystems, described below with reference to FIG. 5.

Applications

Returning to the interaction client 404, features and functions of an external resource (e.g., a linked application 406 or applet) are made available to an end-user via a user interface of the interaction client 404. In this context, "external" refers to the fact that the application 406 or applet is external to the interaction client 404. Here, the external resources may be associated with a mini-app that is hosted by the interaction client 404, which operates in conjunction with the interaction server system 408 and is a component part of a super app. The external resource is often provided by a third party but may also be provided by the creator or provider of the interaction client 404. The interaction client 404 receives an end-user selection of an option to launch or access features of such an external resource. The external resource may be the application 406 installed on the client system 402 (e.g., a "native app"), or a small-scale version of the application (e.g., an "applet") that is hosted on the client system 402 or remote of the client system 402 (e.g., on third-party servers 410). The small-scale version of the application includes a subset of features and functions of the application (e.g., the full-scale, native version of the application) and may be implemented using a markup-language document. In some examples, the small-scale version of the application (e.g., an "applet") is a web-based, markup-language version of the application and is embedded in the interaction client 404. In addition to using markup-language documents (e.g., a .*ml file), an applet may incorporate a scripting language (e.g., a .*js file or a .json file) and a style sheet (e.g., a .*ss file).

In response to receiving an end-user selection of the option to launch or access features of the external resource, the interaction client 404 determines whether the selected external resource is a web-based external resource or a locally-installed application 406. In some cases, applications 406 that are locally installed on the client system 402 can be launched independently of and separately from the interaction client 404, such as by selecting an icon, corresponding to the application 406 on a home screen of the client system 402. Small-scale versions of such applications can be launched or accessed via the interaction client 404 and, in some examples, no or limited portions of the small-scale application can be accessed outside of the interaction client 404. The small-scale application can be launched by the interaction client 404 receiving from a third-party server 410, for example, a markup-language document associated with the small-scale application and processing such a document.

In response to determining that the external resource is a locally-installed application 406, the interaction client 404 instructs the client system 402 to launch the external resource by executing locally-stored code corresponding to the external resource. In response to determining that the external resource is a web-based resource, the interaction client 404 communicates with the third-party servers 410 (for example) to obtain a markup-language document corresponding to the selected external resource. The interaction client 404 then processes the obtained markup-language document to present the web-based external resource within a user interface of the interaction client 404.

The interaction client 404 can notify an end-user of the client system 402, or other end-users connected to such an end-user (e.g., connections or friends), of activity taking place in one or more external resources. For example, the interaction client 404 can provide participants in a conversation (e.g., a chat session) in the interaction client 404 with notifications relating to the current or recent use of an external resource by one or more members of a group of end-users. One or more end-users can be invited to join in an active external resource or to launch a recently-used but currently inactive (in the group of friends) external resource. The external resource can provide participants in a conversation, each using respective interaction clients 404, with the ability to share an item, status, state, or location in an external resource with one or more members of a group of end-users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to end-users on the interaction client 404. The external resource can selectively include different media items in the responses, based on a current context of the external resource.

The interaction client 404 can present a list of the available external resources (e.g., applications 406 or applets) to an end-user to launch or access a given external resource. This list can be presented in a context-sensitive menu. For example, the icons representing different ones of the application 406 (or applets) can vary based on how the menu is launched by the end-user (e.g., from a conversation interface or from a non-conversation interface).

In many instances, these external or third-party applications are, by default, not authorized to access resources of the interaction server system 408, on behalf of the end-user of the application. To gain access to certain resources of the interaction server system 408, these external or third-party applications leverage an open standards authorization protocol, such as Open Authorization (Oauth). Once an end-user has authorized an external or third-party application to access some data or resource owned by or associated with the end-user, an authorization server will provide the external application with an access token. After receiving the access token, requests by the external or third-party application will include the access token, providing the API server 414 of the interaction server system 408 with the ability to verify that the particular application, and the specific end-user using the application, are authorized to access the requested data or resource.

System Architecture

Figure 5:
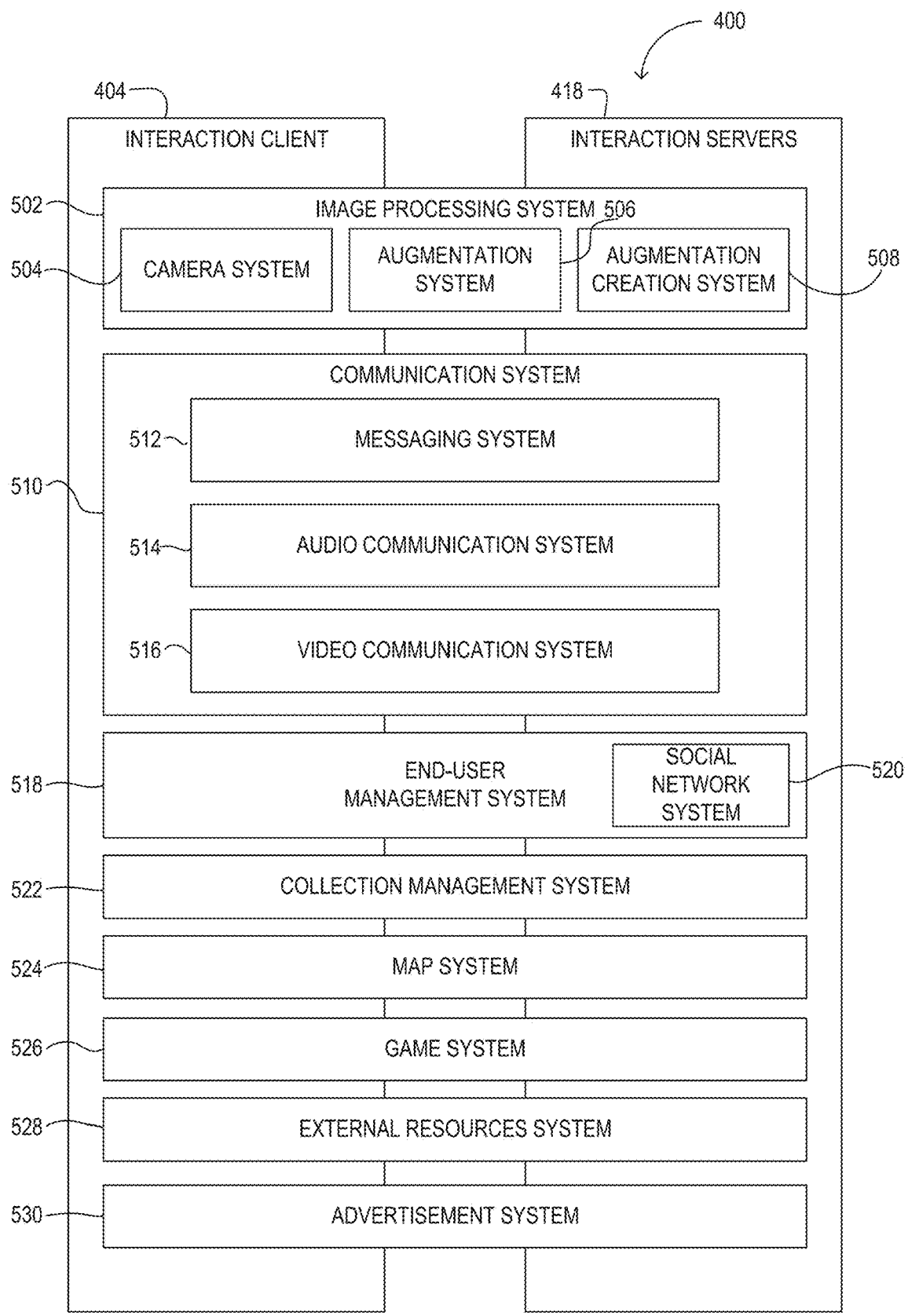
FIG. 5 is a diagrammatic representation of an interaction system that has both client-side and server-side functionality, and with which a data service for constructing, managing and querying an app-to-friend index may be deployed, consistent with some embodiments of the present invention.

FIG. 5 is a block diagram illustrating further details regarding the interaction system 400, consistent with some embodiments of the invention. Specifically, the interaction system 400 is shown to comprise the interaction client 404 and the interaction servers 418. The interaction system 400 embodies multiple subsystems, which are supported on the client-side by the interaction client 404 and on the server-side by the interaction servers 418. Example subsystems are discussed below.

An image processing system 502 provides various functions that enable an end-user to capture and augment (e.g., annotate or otherwise modify or edit) media content associated with a message. A camera system 504 includes control software (e.g., in a camera application) that interacts and controls an image sensor or camera device (e.g., directly or via operating system controls) of the client system 402 to modify and augment real-time images captured by the image sensor and displayed via the interaction client 404. The augmentation system 506 provides functions related to the generation and publishing of augmentations (e.g., media overlays) for images captured in real-time by cameras of the client system 402 or retrieved from memory of the client system 402. For example, the augmentation system 506 operatively selects, presents, and displays media overlays (e.g., an image filter or an image lens) to the interaction client 404 for the augmentation of real-time images received via the camera system 504 or stored images retrieved from memory of a client system 402. These augmentations are selected by the augmentation system 506 and presented to an end-user of an interaction client 404, based on a number of inputs and data, such as, the geolocation of the client system 402, social network information of the end-user of the client system 402, and so forth.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at client system 402 for communication in a message, or applied to video content, such as a video content stream or feed transmitted from an interaction client 404. As such, the image processing system 502 may interact with, and support, the various subsystems of the communication system 510, such as the messaging system 512 and the video communication system 516.

A media overlay may include text or image data that can be overlaid on top of a photograph taken by the client system 402. or a video stream produced by the client system 402. In some examples, the media overlay may be a location overlay (e.g., Venice beach), a name of a live event, or a name of a merchant overlay (e.g., Beach Coffee House). In further examples, the image processing system 502 uses the geolocation of the client system 402 to identify a media overlay that includes the name of a merchant at the geolocation of the client system 402. The media overlay may include other indicia associated with the merchant. The media overlays may be stored in the databases 420 and accessed through the database server 416.

A communication system 510 is responsible for enabling and processing multiple forms of communication and interaction within the interaction system 400 and includes a messaging system 512, an audio communication system 514, and a video communication system 516. The messaging system 512 is responsible for enforcing the temporary or time-limited access to content by the interaction clients 404. The messaging system 512 incorporates multiple timers (e.g., within an ephemeral timer system 532) that, based on duration and display parameters associated with a message, or collection of messages (e.g., a story), selectively enable access (e.g., for presentation and display) to messages and associated content via the interaction client 404. Further details regarding the operation of the ephemeral timer system 532 are provided below. The audio communication system 514 enables and supports audio communications (e.g., real-time audio chat) between multiple interaction clients 404. Similarly, the video communication system 516 enables and supports video communications (e.g., real-time video chat) between multiple interaction clients 404.

An end-user management system 518 is operationally responsible for the management of end-user data and specifically, end-user profiles, and includes a social network system 520 that maintains information regarding relationships between end-users of the interaction system 400. The social network system 520 may have a social graph data service, which can be queried to obtain a list of end-users who are connections or friends of a particular end-user. For example, a query may include an end-user identifier for a given end-user, and the social graph service may process the query by returning in response to the query a list of end-user identifiers of end-users with whom the given end-user has established a connection via the interaction server system 408. As described in greater detail below, an application-to-friend database may be separately maintained as part of an application-to-friend index, and data obtained from the social graph service may be temporarily cached in the application-to-friend database in order to efficiently process queries to identify connections or friends of an end-user, who are also end-users of a specific application.

A collection management system 522 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 522 may also be responsible for publishing an icon that provides notification of a particular collection to the user interface of the interaction client 404. The collection management system 522 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 522 employs machine vision (or image recognition technology) and content rules to curate a content collection automatically. In certain examples, compensation may be paid to an end-user to include user-generated content into a collection. In such cases, the collection management system 522 operates to automatically make payments to such end-users to use their content.

A map system 524 provides various geographic location functions, and supports the presentation of map-based media content and messages by the interaction client 404. For example, the map system 524 enables the display of end-user icons or avatars (e.g., stored in profile data) on a map to indicate a current or past location of connections or friends of an end-user, as well as media content (e.g., collections of messages including photographs and videos) generated by such friends, within the context of a map. For example, a message posted by an end-user to the interaction system 400 from a specific geographic location may be displayed within the context of a map at that particular location to connections or fiends of a specific end-user on a map interface of the interaction client 404. An end-user can furthermore share his or her location and status information (e.g., using an appropriate status avatar) with other end-users of the interaction system 400 via the interaction client 404, with this location and status information being similarly displayed within the context of a map interface of the interaction client 404 to selected end-users.

A game system 526 provides various gaming functions within the context of the interaction client 404. The interaction client 404 provides a game interface providing a list of available games that can be launched by an end-user within the context of the interaction client 404 and played with other end-users of the interaction system 400. The interaction system 400 further enables a particular end-user to invite other end-users to participate in the play of a specific game by issuing invitations to such other end-users from the interaction client 404. The interaction client 404 also supports audio, video, and text messaging (e.g., chats) within the context of gameplay, provides a leaderboard for the games, and also supports the provision of in-game rewards (e.g., coins and items).

An external resource system 528 provides an interface for the interaction client 404 to communicate with remote servers (e.g., third-party servers 410) to launch or access external resources, including in some instances, third-party applications or applets. Each third-party server 410 hosts, for example, a markup language (e.g., HTML5) based application or a small-scale version of an application (e.g., game, utility, payment, ride-sharing, content streaming, and other applications). The interaction client 404 may launch a web-based resource (e.g., application) by accessing the HTML5 file from the third-party servers 410 associated with the web-based resource. Applications hosted by third-party servers 410 are programmed in JavaScript leveraging a Software Development Kit (SDK) provided by or associated with the interaction servers 418. The SDK includes the specification of an API with commands or functions that can be called or invoked by the third-party web-based application. The interaction servers 418 host a JavaScript library that provides a given external resource access to specific user data of the interaction client 404, when authorization to access such data has been granted. HTML5 is an example of a technology for programming games and third-party applications, but applications and resources programmed based on other technologies can be used.

To integrate the functions of the SDK into the third-party web-based resource, the SDK is downloaded by a third-party server 410 from the interaction servers 418 or is otherwise received by the third-party servers 410. Once downloaded or received, the SDK is included as part of the application code of a third-party application or web-based external resource. The code of the web-based resource can then call or invoke certain functions of the SDK to integrate features of the interaction client 404 into the web-based resource.

The SDK stored on the interaction server system 408 effectively provides the bridge between an external resource (e.g., third-party applications 406 or applets and the interaction client 404). This gives the end-user a seamless experience of communicating with other users on the interaction client 404 while also preserving the look and feel of the interaction client 404. To bridge communications between an external resource (e.g., a third party application or resource) and an interaction client 404, the SDK facilitates communication between third-party servers 410 and the interaction client 404. A WebViewJavaScriptBridge running on a client system 402 establishes two one-way communication channels between an external resource and the interaction client 404. Messages are sent between the external resource and the interaction client 404 via these communication channels asynchronously. Each SDK function invocation is sent as a message and callback. Each SDK function is implemented by constructing a unique callback identifier and sending a message with that callback identifier.

By using the SDK, not all information from the interaction client 404 is shared with third-party applications and servers 410. The SDK limits which information is shared based on the needs of the external resource. Each third-party server 410 provides an HTML5 file corresponding to the web-based external resource to interaction servers 418. The interaction servers 418 can add a visual representation (such as a box art or other graphic) of the web-based external resource in the interaction client 404. Once the user selects the visual representation or instructs the interaction client 404 through a GUI of the interaction client 404 to access features of the web-based external resource, the interaction client 404 obtains the HTML5 file and instantiates the resources to access the features of the web-based external resource.

The interaction client 404 presents a graphical user interface (e.g., a landing page or title screen) for an external resource. During, before, or after presenting the landing page or title screen, the interaction client 404 determines whether the launched external resource has been previously authorized to access end-user data of the interaction client 404. In response to determining that the launched external resource has been previously authorized to access end-user data of the interaction client 404, the interaction client 404 presents another graphical user interface of the external resource that includes functions and features of the external resource. In response to determining that the launched external resource has not been previously authorized to access end-user data of the interaction client 404, after a threshold period of time (e.g., 3 seconds) of displaying the landing page or title screen of the external resource, the interaction client 404 slides up (e.g., animates a menu as surfacing from a bottom of the screen to a middle of or other portion of the screen) a menu for authorizing the external resource to access the end-user data. The menu identifies the type of end-user data that the external resource will be authorized to access and/or use. In response to receiving an end-user selection of an option granting the third party application access to the end-user user information, the interaction client 404 adds the external resource to a list of authorized external resources and allows the external resource to access the end-user data from the interaction client 404. The external resource is authorized by the interaction client 404 to access the user data under an OAuth 2 framework.

The interaction client 404 controls the type of end-user data that is shared with external resources based on the type of external resource being authorized. For example, external resources that include full-scale applications (e.g., an application 406) are provided with access to a first type of end-user data (e.g., two-dimensional avatars of users with or without different avatar characteristics). As another example, external resources that include small-scale versions of applications (e.g., web-based versions of applications) are provided with access to a second type of end-user data (e.g., payment information, two-dimensional avatars of end-users, three-dimensional avatars of end-users, and avatars with various avatar characteristics). Avatar characteristics include different ways to customize a look and feel of an avatar, such as different poses, facial features, clothing, and so forth.

An advertisement system 530 operationally enables the purchasing of advertisements by third parties for presentation to end-users via the interaction clients 404 and also handles the delivery and presentation of these advertisements.

Application-to-Friend Data Service Architecture

Figure 6:
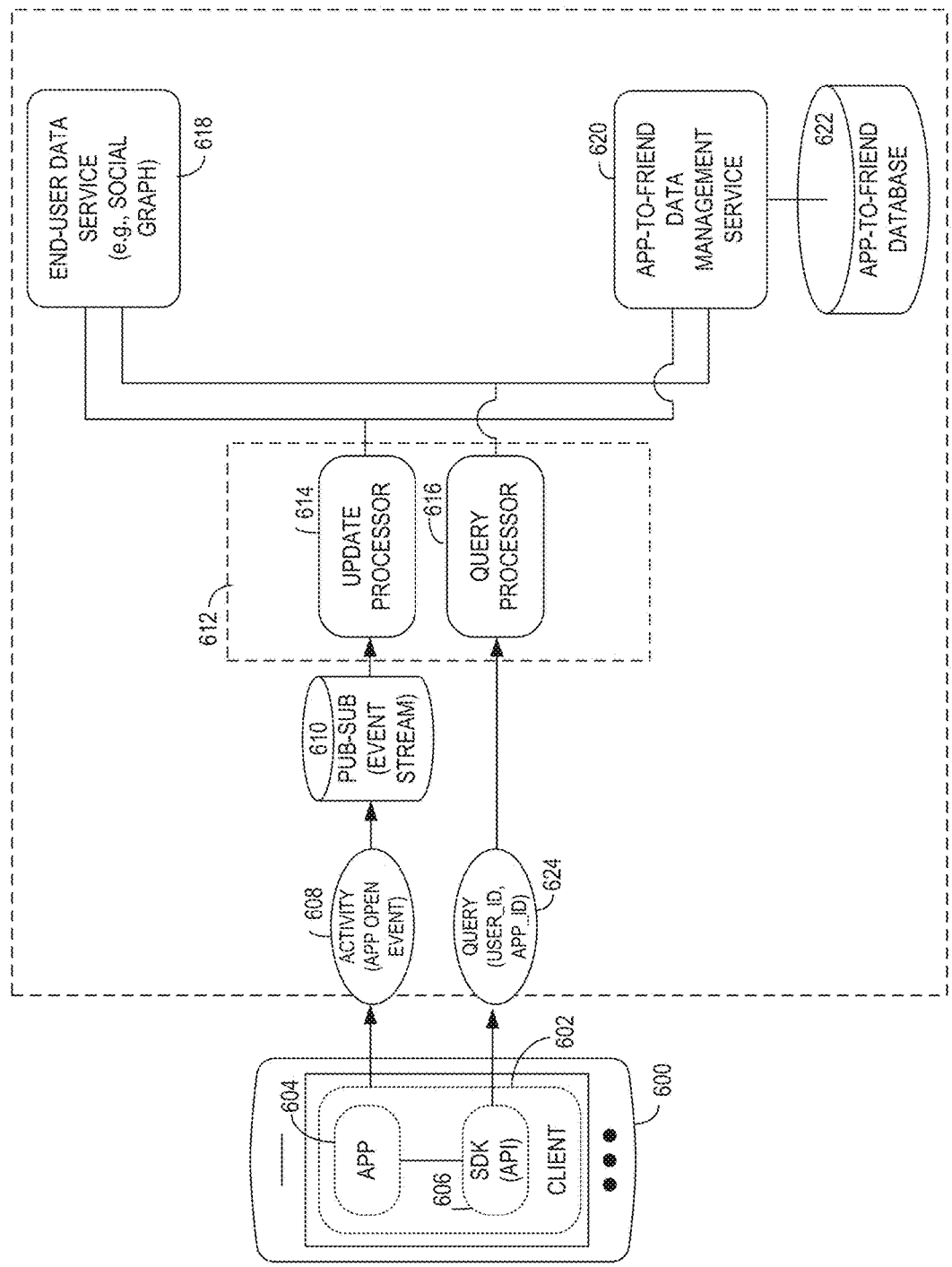
FIG. 6 is a diagrammatic representation illustrating how a mini-app, executing at least in part on a mobile computing device, may interact with a data service for constructing, managing and querying an app-to-friend index, consistent with some embodiments of the present invention.

FIG. 6 is a diagrammatic representation illustrating how an application or mini-app 604, executing at least in part at a client computing device 600, may interact with an application-to-friend data service 610 for constructing, maintaining, and querying an application-to-friend index, consistent with some embodiments of the present invention. As shown in FIG. 6, a client computing device 600 is executing a client application 602. In this instance, the client application 602 is serving as a host application for the application with reference number 604. For example, the client application 602 may be a super app and serve as a host to other applications or mini-apps.

When an end-user of the client application 602 opens, or otherwise accesses or invokes the application 604, the application 604 will communicate an activity event (e.g., an app open event 608) over a network to a publication/subscription service 610. As shown in FIG. 6 with reference 612, the application-to-friend data service 612 is comprised of two component services—an update processor 614, and a query processor 616. The update processor 614 tis triggered to operate when the app open event 608 is published to the publication/subscription service 610. Accordingly, when the update processor 614 identifies or receives the event 608, the update processor will perform a variety of operations. For instance, the update processor will write a data record to the application-to-friend database to indicate that the end-user of the application 604 opened the application 604, and is therefore to be considered an end-user of the application 604. Additionally, the update processor will obtain a first list of connections or friends of the end-user, for example, by making a call or request to an end-user data service 618. The end-user data service 618 will return to the update processor 614 a first list of connections or friends of the end-user. The update processor 614 will additionally obtain a second list of connections or friends of the end-user from the application-to-friend database 622. The update processor 614 will then compare the first list with the second list. If, for example, it is the first time an end-user has opened an application, such that the application-to-friend data service is being invoked for the end-user for the very first time, there will be no data that has been written to the application-to-friend database to reflect the connections or friends of the end-user. In this case, the update processor will store the entire list of connections or friends to the application-to-friend database. Then, for any subsequent call to the data service on behalf of the end-user, the first list of connections or friends, as obtained from the end-user data service 618 can be compared with the second list, as obtained from the application-to-friend database, to simply identify any discrepancies. For instance, a connection or friend that is included in the first list (e.g., as obtained from the end-user data service 618) but excluded or not present in the second list (e.g., as obtained from the application-to-friend database) is a new connection or friend. Similarly, if a connection or friend is included in the second list of connections or friends (e.g., as obtained form the application-to-friend database), but not included in the first list, this suggests that the connection or friend was previously a connection or friend, but is no longer a connection or friend.

In addition to updating the list of connections or friends, the update processor will write data records to the application-to-friend database to reflect which specific connections or friends of the end-user are also end-users of the application. Accordingly, for example, if the end-user of the application 604 is identified as end-user "A" and another end-user "B" is a connection or friend of end-user "A" and is also an end-user of the application 604, the update processor 614 will create two data records to reflect the bidirectional nature of the connection. For instance, the update processor will create a first data record to indicate that, for the application 604 and the end-user identified as end-user "A", end-user "B" is a friend of end-user "A" and also an end-user of the application 604. Similarly, the update processor will create a second data record to indicate that, for the application 604 and the end-user identified as end-user "B", end-user "A" is a friend of end-user "B" and also an end-user of the application 604.

Subsequent to the update processor 614 performing operations to update the application-to-friend database 622, the application 604 will make an API request or call 624 to the query processor 616 of the application-to-friend data service 612. As shown in FIG. 6, the query 624 includes two parameters—a first parameter indicating an application identifier that uniquely identifies the application that is invoking the API request, and a second parameter indicating the identifier of the end-user on whose behalf the API request has been invoked. The query processor 616 will then obtain from the application-to-friend database 622 all the data records identifying connections or friends of the end-user (as identified in the query 624). This list of connections or friends is then returned to the application 604, which can then present the list of connections or friends to the end-user.

Figure 7:
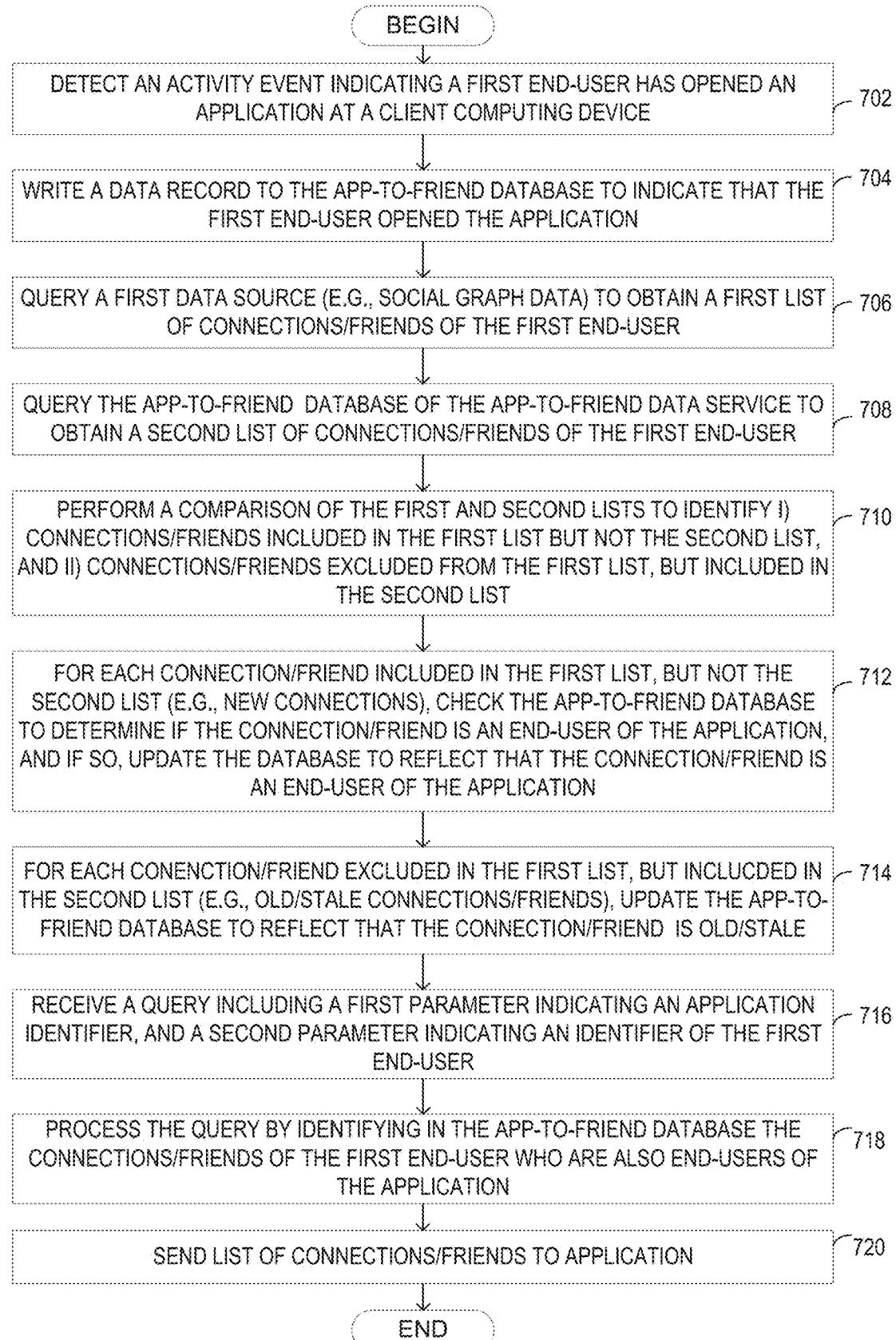
FIG. 7 is a flow diagram illustrating an example of the method operations performed by a mini-app interacting with a data service for constructing, managing and querying an app-to-friend index, consistent with some embodiments of the present invention.

FIG. 7 is a flow diagram illustrating an example of the method operations performed when an application interacts with an application-to-friend data service for constructing, maintaining, and querying an application-to-friend index, consistent with some embodiments of the present invention. In the examples presented and described in connection with FIG. 7, specific implementation details of a database are discussed. For example, consistent with some embodiments, a NoSQL database may be used to implement the data service. Accordingly, described below are different types of row schemas that may be implemented as part of a single database table. However, in alternative embodiments, a variety of other types of databases—including a relational database—could be used to implement embodiments of the invention, and each type of row schema described below could be an individual table, for example.

At method operation 702, in response to a first end-user opening an application or mini-app, the update processor of the application-to-friend data service detects an activity event indicating that a first end-user has opened a specific application at a client computing device. By way of example, an activity event referred to herein as an app open event may include information indicating an identifier of the application that has been opened, an identifier of the end-user who opened the application, and a date/time at which the application was opened.

At method operation 704, the update processor will write a data record to the application-to-friend database to indicate that the first end-user opened the application at the time indicated in the activity event. Consistent with some embodiments of the invention, the application-to-friend database may be a noSQL database and may have a single table with three different types of row schemas. Accordingly, the update processor may write a data record to a first row schema referred to herein as User App Data. The schema for User App Data may have a first column or field for storing the identifier of the first end-user, a second column or field for storing the identifier of the application that was opened by the first end-user, and a third column or field for storing a timestamp indicating the date and time the application was opened by the first end-user.

Next, after writing the data record to User App Data, the update processor will update the database to reflect which of the first end-user's connections or friends are end-users of the application that was opened by the first end-user. As shown in FIG. 7, this task is advantageously performed only for new connections or friends. For example, at method operation 706, the update processor will query a first data source (e.g., an end-user data service or a social graph service) to obtain a first list of connections or friends of the end-user. At operation 706, the update processor will obtain a second list of the first end-user's connections or friends from the database of the application-to-friend data service. Then, at operation 708, the update processor will compare the first list with the second list to determine any discrepancies. For instance, a connection or friend present in the first list, but not in the second list, is the result of the end-user having established a new connection or friend, subsequent to the update processor having last been invoked for the first end-user.

Consistent with some embodiments, a second type of row schema, referred to herein as Checked App Friends, may be used to store data records indicating the current connections or friends of a particular end-user. For example, Checked App Friends may include a first column or field to store an identifier of the end-user, a second column or field to store the identifier of the application, and a third column or field to store a list of connections or friends that have been checked or processed by the update processor. Accordingly, when the update processor is invoked for the very first time for a specific application and end-user, the database (e.g., Checked App Friends) will not yet have a data record. When the update processor is invoked for the first time for a given end-user and application, the update processor will write a data record to Checked App Friends, indicating the connections or friends of the end-user.

Accordingly, at operation 710, the update processor will compare the first list of connections or friends of the end-user, as obtained from the data service that manages the social graph data for the online service, with the second list of connections or friends of the end-user, as obtained from the application-to-friend database (e.g., Checked App Friends). Then, at operation 712, for each new connection or friend—that is, for each connection or friend included in the first list, but not included or present in the second list—the update processor will query the database to determine whether the new connection is an end-user of the application. Specifically, the update processor will query User App Data. If the new connection has recently opened the application, a data record will be present in User App Data indicating the date/time at which the new connection opened the application. If a data record is found, then the update processor will add the end-user identifier of the new connection or friend to the database. Specifically, the update processor will add two records to a third, row schema, referred to herein as Connected App Friends. Two records are necessary because of the bidirectional nature of the connection between the two end-users. Consistent with some embodiments, Connected App Friends will have a first column or field for the identifier of the first end-user (e.g., the end-user on whose behalf the update processor was initially invoked), a second column or field for storing an identifier of the application, and a third column or field to store the end-user identifier of the connection or friend whose identifier is present in the first column or field.

In addition to updating the database to reflect all of the connections or friends of the first end-user who are also end-users of the application, at method operation 714, for each old or stale connection or friend—that is, a connection or friend not appearing in the first list of connections or friends, as obtained from the data service managing the social graph data, but included in the database managed by the application-to-friend data service—the update processor will remove any previously written data records that indicate a stale connection or friend of the first end-user is an end-user of the application. Here again, two data records are update as each connection between two end-users is bidirectional.

After the application-to-friend database has been updated by the update processor of the application-to-friend data service, the query processing component of the application-to-friend data service receives from the application an API request, as shown in FIG. 7 as method operation 708. The API request includes two parameters—a first parameter specifying an application identifier of the application that invoked the API call or request, and a second parameter specifying an end-user identifier of the end-user on whose behalf the API call or request was made. Finally, at operation 718, the query processing component obtains from the application-to-friend database the list of end-users who are both end-users of the application and connections or friends of the first end-user, —that is, the end-user identified in the API call or request. This list of connections or friends is then returned to the application that invoked the API call or request, at method operation 720. The application may then use the end-user identifiers of the connections or friends of the end-user to obtain more detailed information about each end-user who is a connection or friend of the first end-user.

When the application-to-friend data service is executed or started for the very first time, the database will have no data, as the update processor will not yet have added any data to the database table. Accordingly, consistent with some embodiments, it may be advantageous to populate the database table of the data service by processing updates when app open activity events are detected, but bypassing the query processing component for some period of time until the database has a sufficient amount of data.

Machine Architecture

Figure 8:
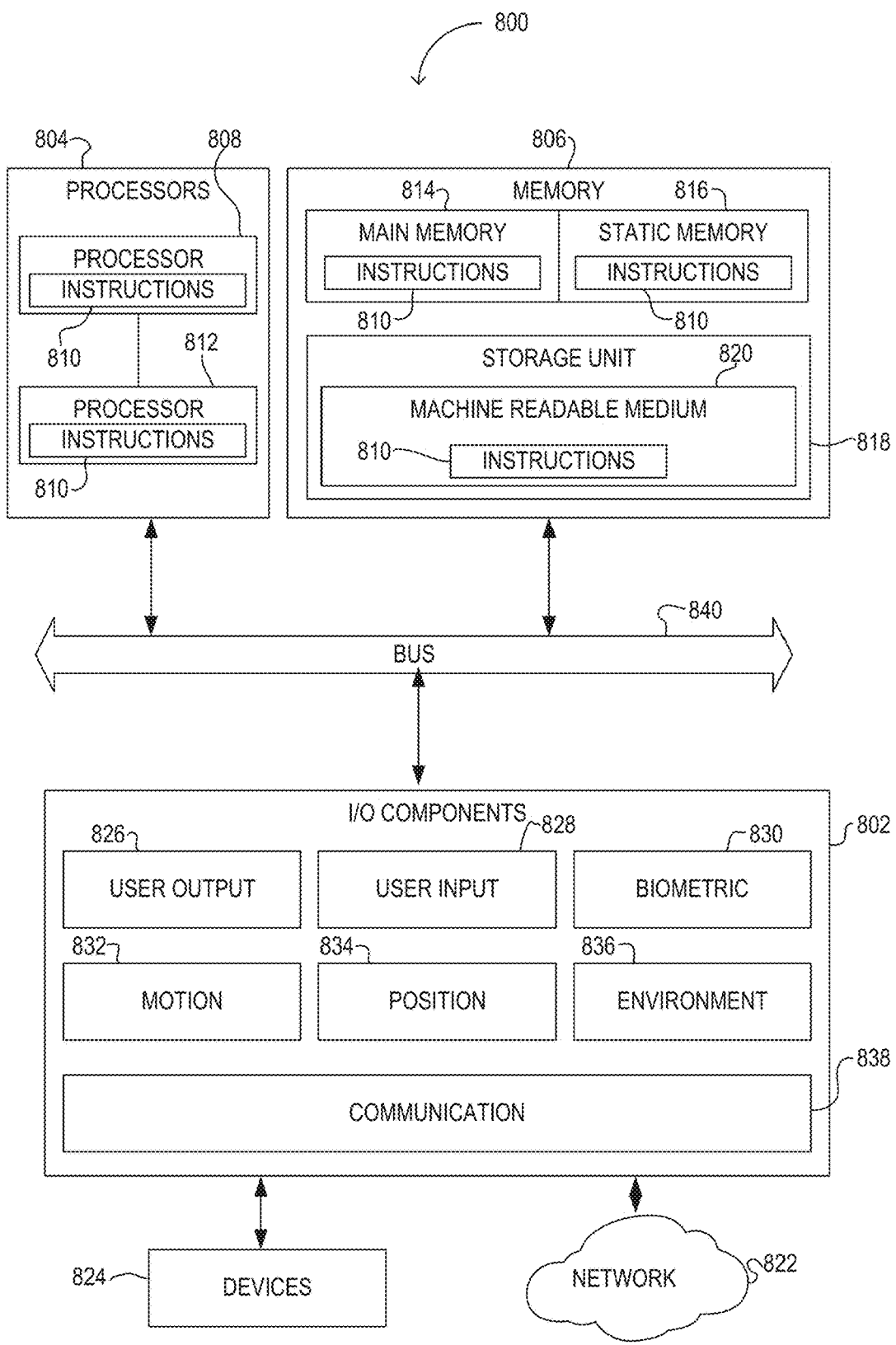
FIG. 8 is a diagrammatic representation of a machine in the form of a computer system within which a set of instructions may be executed for causing the machine to perform any one or more of the methodologies discussed herein, according to some examples.

FIG. 8 is a diagrammatic representation of a machine 800 within which instructions 810 (e.g., software, a program, an application or app, a mini-app, an applet, or other executable code) for causing the machine 800 to perform any one or more of the methodologies discussed herein may be executed. For example, the instructions 810 may cause the machine 800 to execute any one or more of the methods described herein. The instructions 810 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine (e.g., client computing device) in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while a single machine 800 is illustrated, the term "machine" shall also be taken to include a collection of machines that individually or jointly execute the instructions 810 to perform any one or more of the methodologies discussed herein. The machine 800, for example, may comprise the client system 402 or any one of multiple server devices forming part of the interaction server system 408. In some examples, the machine 800 may also comprise both client and server systems, with certain operations of a particular method or algorithm being performed on the server-side and with certain operations of the particular method or algorithm being performed on the client-side.

The machine 800 may include processors 804, memory 806, and input/output I/O components 802, which may be configured to communicate with each other via a bus 840. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 808 and a processor 812 that execute the instructions 810. The term "processor" is intended to include multi-core processors that may comprise two or more independent processors (sometimes referred to as "cores") that may execute instructions contemporaneously. Although FIG. 8 shows multiple processors 804, the machine 800 may include a single processor with a single-core, a single processor with multiple cores (e.g., a multi-core processor), multiple processors with a single core, multiple processors with multiples cores, or any combination thereof.

The memory 806 includes a main memory 814, a static memory 816, and a storage unit 818, all accessible to the processors 804 via the bus 840. The main memory 806, the static memory 816, and storage unit 818 store the instructions 810 embodying any one or more of the methodologies or functions described herein. The instructions 810 may also reside, completely or partially, within the main memory 814, within the static memory 816, within machine-readable medium 820 within the storage unit 818, within at least one of the processors 804 (e.g., within the processor's cache memory), or any suitable combination thereof, during execution thereof by the machine 800.

The I/O components 802 may include a wide variety of components to receive input, provide output, produce output, transmit information, exchange information, capture measurements, and so on. The specific I/O components 802 that are included in a particular machine will depend on the type of machine. For example, portable machines such as mobile phones may include a touch input device or other such input mechanisms, while a headless server machine will likely not include such a touch input device. It will be appreciated that the I/O components 802 may include many other components that are not shown in FIG. 8. In various examples, the I/O components 802 may include user output components 826 and user input components 828. The user output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 802 may include biometric components 830, motion components 832, environmental components 836, or position components 834, among a wide array of other components. For example, the biometric components 830 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 832 include acceleration sensor components (e.g., accelerometer), gravitation sensor components, rotation sensor components (e.g., gyroscope).

The environmental components 836 include, for example, one or more image sensors or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client system 402 may have a camera system 504 comprising, for example, front cameras on a front surface of the client system 402 and rear cameras on a rear surface of the client system 402. The front cameras may, for example, be used to capture still images and video of an end-user of the client system 402 (e.g., "selfies"), which may then be augmented with augmentation data (e.g., filters) as referenced above. The rear cameras may, for example, be used to capture still images and videos in a more traditional camera mode, with these images similarly being augmented with augmentation data. In addition to front and rear cameras, the client system 402 may also include a 360° camera for capturing 360° photographs and videos.

Further, the camera system 504 of the client system 402 may include dual rear cameras (e.g., a primary camera as well as a depth-sensing camera), or even triple, quad or penta rear camera configurations on the front and rear sides of the client system 402. These multiple cameras systems may include a wide camera, an ultra-wide camera, a telephoto camera, a macro camera, and a depth sensor, for example.

The position components 834 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 802 further include communication components 838 operable to couple the machine 800 to a network 822 or devices 824 via respective coupling or connections. For example, the communication components 838 may include a network interface component or another suitable device to interface with the network 822. In further examples, the communication components 838 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 824 may be another machine or any of a wide variety of peripheral devices (e.g., a peripheral device coupled via a USB).

Moreover, the communication components 838 may detect identifiers or include components operable to detect identifiers. For example, the communication components 838 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 838, such as location via Internet Protocol (IP) geolocation, location via Wi-Fi® signal triangulation, location via detecting an NFC beacon signal that may indicate a particular location, and so forth.

The various memories (e.g., main memory 814, static memory 816, and memory of the processors 804) and storage unit 818 may store one or more sets of instructions and data structures (e.g., software) embodying or used by any one or more of the methodologies or functions described herein. These instructions (e.g., the instructions 810), when executed by processors 804, cause various operations to implement the disclosed examples.

The instructions 810 may be transmitted or received over the network 822, using a transmission medium, via a network interface device (e.g., a network interface component included in the communication components 838) and using any one of several well-known transfer protocols (e.g., hypertext transfer protocol (HTTP)). Similarly, the instructions 810 may be transmitted or received using a transmission medium via a coupling (e.g., a peer-to-peer coupling) to the devices 824.

Software Architecture

Figure 9:
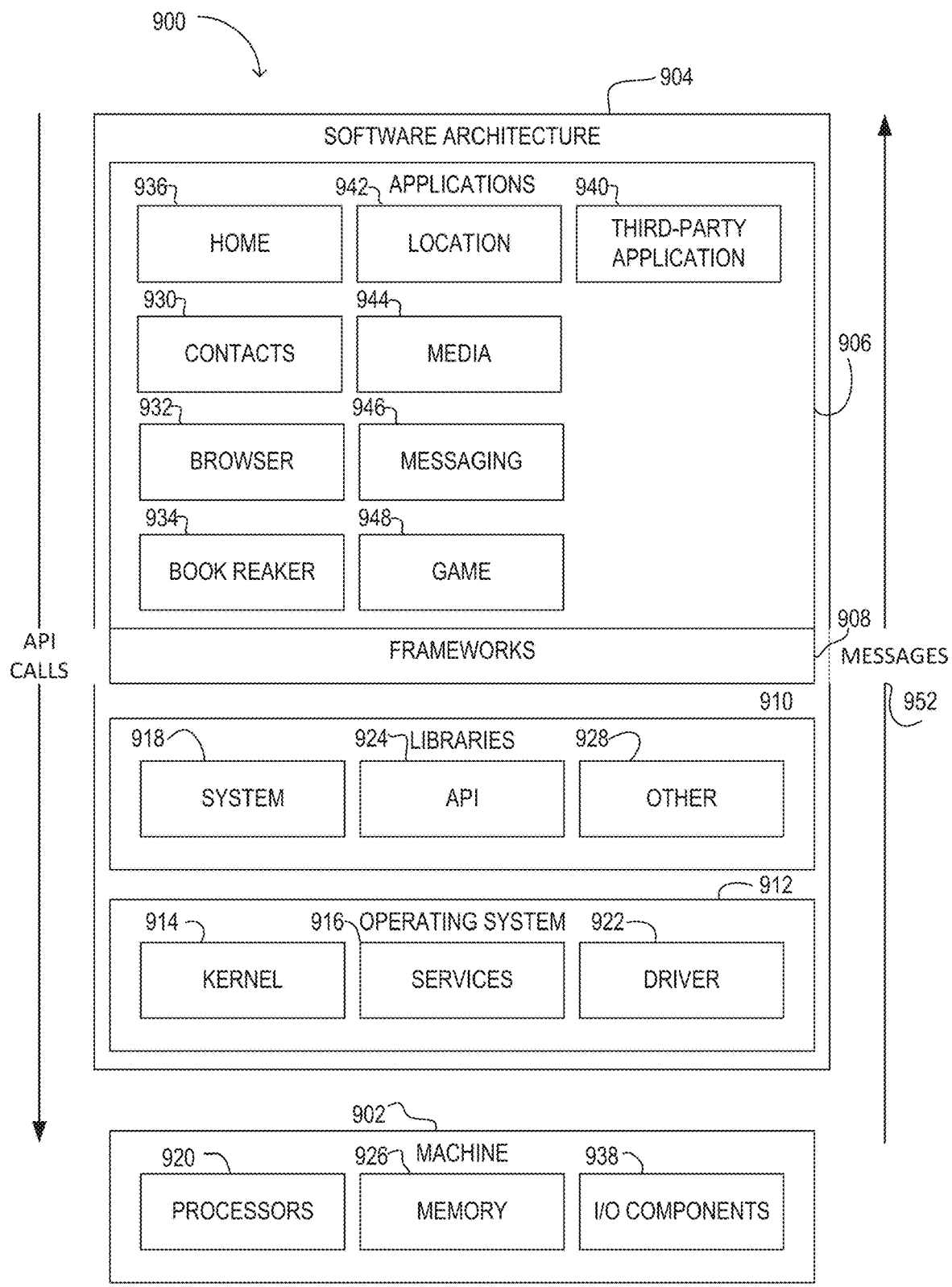
FIG. 9 is a block diagram showing a software architecture within which examples may be implemented.

FIG. 9 is a block diagram 900 illustrating a software architecture 904, which can be installed on any one or more of the devices described herein. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionalities. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 910 provide a common low-level infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a common high-level infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In an example, the applications 906 may include a home application 936, a contacts application 930, a browser application 932, a book reader application 934, a location application 942, a media application 944, a messaging application 946, a game application 948, and a broad assortment of other applications such as a third-party application 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 940 can invoke the API calls 950 provided by the operating system 912 to facilitate functionalities described herein.

Glossary

"Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" (or "client computing device") refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting, or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A computer-implemented method comprising:
   in response to detecting an activity event indicating a first end-user has opened an application at a client computing device:
   invoking a first service component of an application-to-friend data service to perform operations comprising i) updating an application-to-friend database with a first data record indicating a time at which the first end-user opened the application, and ii) updating the application-to-friend database with one or more data records, each data record of the one or more data records identifying an end-user of the application who is a friend of the first end-user, wherein updating the application-to-friend database with one or more data records further comprises:
   obtaining from a data source a first list of friends of the first end-user;
   obtaining from the application-to-friend database a second list of friends of the first end-user:
   comparing the first list of friends of the first end-user with the second list of friends of the first end-user; and
   updating the application-to-friend database with data records only for friends of the first end-user who are included in the first list of friends of the first end-user and excluded from the second list of friends of the first end-user; and
   in response to receiving a query via an application programming interface (API) call invoked by the application:
   processing the query with a second service component of the application-to-friend data service by i) reading all data records from the database that identify end-users of the application who are friends of the first end-user, and ii) returning, to the application, data indicating end-users of the application who are friends of the first end-user.

2. The computer-implemented method of claim 1, wherein updating the application-to-friend database with data records only for friends of the first end-user who are included in the first list of friends of the first end-user and excluded from the second list of friends of the first end-user comprises:
for each friend of the first end-user who is included in the first list of friends of the first end-user and excluded from the second list of friends of the first end-user:
determining that the friend is an end-user of the application; and
adding two data records to the application-to-friend database to reflect a bidirectional nature of the connection.

3. The computer-implemented method of claim 1, wherein the first service component additionally performs an operation to update the application-to-friend database by removing data records for any friend of the first end-user excluded from the first list of friends of the first end-user and included in the second list of friends of the first end-user.

4. The computer-implemented method of claim 1, wherein the list of friends of the first end-user obtained from the application-to-friend database is associated with a time to live parameter, and the data service is to delete a list of friends when a time indicated by the time to live parameter is reached.

5. The computer-implemented method of claim 1, wherein the application-to-friend database is a NoSQL database having a single table with three types of row schemas comprising:
a first row schema having a first column for storing an application identifier and a second column for storing an end-user identifier;
a second row schema having a first column for storing an end-user identifier and a second column for storing a list of friends of the end-user who has the identifier stored in the first column; and
a third row schema having a first column for storing an end-user identifier, a second column for storing an application identifier, and a third column to store an identifier of an end-user who is a friend of the end-user identified by the end-user identifier in the first column and who is an end user of the application identified by the application identifier stored in the second column.

6. The computer-implemented method of claim 5, wherein the second row schema includes an additional column for storing a parameter indicating a time to live for a data record.

7. A system comprising:
a processor for executing computer-readable instructions; and
a memory device storing instructions thereon, which, when executed by the processor, cause the system to:
in response to detecting an activity event indicating a first end-user has opened an application at a client computing device:
invoking a first service component of an application-to-friend data service to perform operations comprising i) updating an application-to-friend database with a first data record indicating a time at which the first end-user opened the application, and ii) updating the application-to-friend database with one or more data records, each data record of the one or more data records identifying an end-user of the application who is a friend of the first end-user, wherein updating the application-to-friend database with one or more data records further comprises:
obtaining from a data source a first list of friends of the first end-user;
obtaining from the application-to-friend database a second list of friends of the first end-user;
comparing the first list of friends of the first end-user with the second list of friends of the first end-user; and
updating the application-to-friend database with data records only for friends of the first end-user who are included in the first list of friends of the first end-user and excluded from the second list of friends of the first end-user; and
in response to receiving a query via an application programming interface (API) call invoked by the application:
processing the query with a second service component of the application-to-friend data service by i) reading all data records from the database that identify end-users of the application who are friends of the first end-user, and ii) returning, to the application, data indicating end-users of the application who are friends of the first end-user.

8. The system of claim 7, wherein the operation to update the application-to-friend database with data records only for friends of the first end-user who are included in the first list of friends of the first end-user and excluded from the second list of friends of the first end-user comprises:
for each friend of the first end-user who is included in the first list of friends of the first end-user and excluded from the second list of friends of the first end-user:
determining that the friend is an end-user of the application; and
adding two data records to the application-to-friend database to reflect a bidirectional nature of the connection.

9. The system of claim 7, wherein the first service component additionally performs an operation to update the application-to-friend database by removing data records for any friend of the first end-user excluded from the first list of friends of the first end-user and included in the second list of friends of the first end-user.

10. The system of claim 7, wherein the list of friends of the first end-user obtained from the application-to-friend database is associated with a time to live parameter, and the data service is to delete a list of friends when a time indicated by the time to live parameter is reached.

11. The system of claim 7, wherein the application-to-friend database is a NoSQL database having a single table with three types of row schemas comprising:
a first row schema having a first column for storing an application identifier and a second column for storing an end-user identifier;
a second row schema having a first column for storing an end-user identifier and a second column for storing a list of friends of the end-user who has the identifier stored in the first column; and
a third row schema having a first column for storing an end-user identifier, a second column for storing an application identifier, and a third column to store an identifier of an end-user who is a friend of the end-user identified by the end-user identifier in the first column and who is an end user of the application identified by the application identifier stored in the second column.

12. The system of claim 11, wherein the second row schema includes an additional column for storing a parameter indicating a time to live for a data record.

13. A computer-readable medium storing instructions thereon, which, when executed by a processor, will cause the processor to perform operations comprising:
detecting an activity event indicating a first end-user has opened an application at a client computing device;

responsive to detecting the activity event, invoking a first service component of an application-to-friend data service to perform operations comprising i) updating an application-to-friend database with a first data record indicating a time at which the first end-user opened the application, and ii) updating the application-to-friend database with one or more data records, each data record of the one or more data records identifying an end-user of the application who is a friend of the first end-user, wherein updating the application-to-friend database with one or more data records further comprises:

obtaining from a data source a first list of friends of the first end-user;

obtaining from the application-to-friend database a second list of friends of the first end-user;

comparing the first list of friends of the first end-user with the second list of friends of the first end-user; and updating the application-to-friend database with data records only for friends of the first end-user who are included in the first list of friends of the first end-user and excluded from the second list of friends of the first end-user;

receiving a query via an application programming interface (API) call invoked by the application; and response to receiving the query, processing the query with a second service component of the application-to-friend data service by i) reading all data records from the database that identify end-users of the application who are friends of the first end-user, and ii) returning, to the application, data indicating end-users of the application who are friends of the first end-user.

14. The computer-readable medium of claim 13, wherein the operations further comprise:

for each friend of the first end-user who is included in the first list of friends of the first end-user and excluded from the second list of friends of the first end-user:

determining that the friend is an end-user of the application; and adding two data records to the application-to-friend database to reflect a bidirectional nature of the connection.

15. The computer-readable medium of claim 13, wherein the operations further comprise performing an operation to update the application-to-friend database by removing data records for any friend of the first end-user excluded from the first list of friends of the first end-user and included in the second list of friends of the first end-user.

16. The computer-readable medium of claim 13, wherein the list of friends of the first end-user obtained from the application-to-friend database is associated with a time to live parameter, and the data service is to delete a list of friends when a time indicated by the time to live parameter is reached.

17. The computer-readable medium of claim 13, wherein the application-to-friend database is a NoSQL database having a single table with three types of row schemas comprising:

a first row schema having a first column for storing an application identifier and a second column for storing an end-user identifier;

a second row schema having a first column for storing an end-user identifier and a second column for storing a list of friends of the end-user who has the identifier stored in the first column; and a third row schema having a first column for storing an end-user identifier, a second column for storing an application identifier, and a third column to store an identifier of an end-user who is a friend of the end-user identified by the end-user identifier in the first column and who is an end user of the application identified by the application identifier stored in the second column.

* * * * *